United States Patent [19]
Sacks

[11] 4,300,164
[45] Nov. 10, 1981

[54] ADAPTIVE VIDEO PROCESSOR

[75] Inventor: Jack Sacks, Thousand Oaks, Calif.

[73] Assignee: View Engineering, Inc., Chatsworth, Calif.

[21] Appl. No.: 133,499

[22] Filed: Mar. 21, 1980

[51] Int. Cl.³ .................. H04N 5/14; H04N 1/40; G06K 9/12

[52] U.S. Cl. .................. 358/163; 358/166; 358/284; 340/146.3 AG

[58] Field of Search .............. 358/163, 166, 160, 171, 358/280, 282, 284, 101, 107; 340/146.3 AG; 307/354, 362, 363; 328/115, 127, 167; 375/76

[56] References Cited
PUBLICATIONS

Calfee, "Adaptive FSK Data Demodulator", *IBM Technical Disclosure Bulletin*, vol. 5, No. 11, Apr. 1963, p. 76.

*Primary Examiner*—John C. Martin
*Attorney, Agent, or Firm*—Singer and Singer

[57] ABSTRACT

In a pattern recognition system the video output signal is a signal representative of either black or white. The shading effect of the video camera is minimized by using a high pass filter to accentuate the high frequency components of the signal by partially differentiating the substantially square wave input video signal and feeding forward a sample of the undifferentiated signal thereby retaining some low frequency components of the video signal and thereby minimizing the shading effect of the video camera without increasing detected noise components. Positive and negative-going zero crossings with respect to ground are detected through a capacitive coupled comparator circuit. In the absence of zero crossings the discharge circuit and charge circuit of the capacitor is interrupted thereby maintaining the value of the voltage on the capacitor with respect to ground. Changing the charge and discharge rate of the capacitor reduces the probability that noise on the signal will cause a false zero crossing.

14 Claims, 5 Drawing Figures

ADAPTIVE VIDEO PROCESSOR

This invention relates to an adaptive video processor for use with a pattern recognition system that reduces the effect of shading common to present day vidicons. More specifically, the present invention changes both the positive-going signal with respect to ground and the negative-going signal with respect to ground, thereby decreasing the probability that noise associated with the video signal will cause false zero crossings.

The present invention is concerned primarily for use with an image processor utilizing conventional video camera means having a horizontal scan frequency of 15.75 kilohertz and a vertical scan frequency of 60 hertz.

In the normal configuration the pattern recognition system is intended to detect changes of light and dark signals as a zero crossing output from the video processor as a measure of a detected scene pattern. Unfortunately it is possible in present-day pattern recognition systems for a complete horizontal scan to produce a single contrast polarity such as black or white which in effect will produce a single zero crossing.

Unfortunately present-day vidicon camera devices are not capable of generating a constant amplitude output over the face of the vidicon.

Present-day vidicons electromagnetically or electrostatically deflect an electron beam across a face plate having a photoconductor layer. The vidicon output is in rastor scan format and should be of uniform amplitude throughout the scan for a given constant incident illumination.

Unfortunately vidicons are subject to anomalies that produce an undesirable component of signal called shading.

In one particular pattern recognition system embodiment, black signals are clamped to a dark current dependent black level and all other signals are measured from black as shades of white. Signals that are more white than other signals are detected as signals of increased amplitude as measured from the black reference signal. Unfortunately, because of the shading problem in the vidicon, the output signal for a given uniform illumination does not produce a constant amplitude signal over the complete face plate of the vidicon but, rather, produces a varying signal that varies from line scan to line scan and is non-linear with respect to each scan and, hence, is not predictable across the face of the tube.

The shading effect not only adds a signal component but also multiplies the signal amplitude; the output appears as a modulation of the basic signal that is multiplicative as well as additive.

The shading characteristic is mainly a low frequency anomaly whose fundamental component is 15.75 kilohertz which is the lowest frequency rate that would be apparent for a single scan.

It must be remembered that in pattern recognition systems the object is to continuously detect alternate black and white bands that are relatively close together. However, it is possible to detect a complete scan that may either be all black or all white and, hence, we are primarily concerned with the lowest line scan frequency of 15.75 kilohertz and the vertical scan frequency of 60 hertz where the effects of shading are dominant.

In the prior art pattern recognition systems, black level is determined and clamped and the white signal is detected relative to the clamped black signal. In other words, the more white signal the greater the amplitude of the output and the less white signal the lower the amplitude of the signal. The amplitude of the output signal is dependent upon the response characteristics and the shading effect of the video camera.

A prior art technique is described and claimed in patent application Ser. No. 939,061, filed Sept. 1, 1978, and issued on Apr. 29, 1980 as U.S. Pat. No. 4,200,861 to the same assignees as the present invention.

In the present invention the effect of shading is minimized by passing the video signal through a high pass network that partially differentiates the input signal and thereby attenuates the low frequency and d.c. components of the input signal. In the preferred embodiment a portion of the undifferentiated signal is fed forward and added to the differential signal, thereby adding some low frequency content to the input signal, so as to equalize the frequency or spectral content of the signal.

Since the shading component of the video camera accentuates the low frequency components of the video signal, boosting the high frequency components or attenuating the lows has the effect of providing a substantially constant amplitude output for both the high frequency components and the low frequency components of the video signal while reducing shading.

Feeding forward a portion of the undifferentiated signal tends to keep the high frequency noise component of the signal displaced from the ground threshold (the ground level or zero level threshold is described later).

The system is extremely accurate and works well in the presence of strong light signals; however, in the presence of varying light levels or where the degree of difference between the white signal and the black signal is small, such as a gray signal, the output is a reduced amplitude signal when measured against a black signal that will have many irregularities such as that generated by noise components riding on the output signal. These noise components on the low level output signal can be erroneously detected as a desired output thus producing false alarm output signals thereby degrading pattern recognition system performance.

It is an object, therefore, of the present system to develop a system in which an increase in illumination generates a signal change in one direction while at the same time generating an output signal indicative of a dark signal in the opposite direction. The threshold may therefore be kept at zero and since both the positive and negative-going signals are generated about the zero or ground signal it is no longer necessary to generate a black reference signal.

In other words, the threshold is now maintained at ground; white signals are measured positively with respect to ground and black or dark signals are measured negatively with respect to ground and hence all signals vary proportionally about the threshold which in this case is ground level.

In the present invention a video camera generates a video signal representative of the scene being scanned.

Circuit means in the form of a high pass filter circuit differentiates the video signal. A portion of the undifferentiated video signal is fed forward and added to the differentiated signal so as to retain some low frequency and d.c. energy.

The filtered video signal is fed through a capacitor which generates a voltage across a resistor to ground, which voltage is fed to a comparator. The comparator generates an output whenever the filtered video signal has a zero crossing, indicating a transition from white to black or black to white. The output of the comparator is used to open a switch in the resistor circuit in the absence of detecting zero crossings thereby preventing the capacitor from being discharged or charged, and thus maintaining the charge on the capacitor until a zero crossing is again detected by the comparator circuit which closes the switch and allows the capacitor voltage to be discharged or charged.

In the preferred embodiment separate resistors are used, one for the charging circuit and one for the discharging circuit, and separate outputs from the comparing circuits are used to thereby control the charging and discharging rates of the capacitor.

The circuit thereby provides a convenient means for varying the output signal around the ground threshold to thereby minimize the chance effect of noise or extraneous signals being detected as a valid zero crossing by the comparator circuit, and makes the system independent of illumination level.

In the preferred embodiment a single shot multi vibrator having approximately a 5 microsecond period is used to open the switch in the event a zero crossing is not detected in that period of time. In this way the charging of the capacitor and the discharging of the capacitor can be separately controlled and, if desired, charged and discharged at different rates.

Further objects and advantages of the present invention will be made more apparent by referring now to the accompanying drawings wherein.

In the present invention we are concerned primarily with a digital pattern recognition system in which the transitions from light to dark are detected and measured as the zero crossings of the video signal passing through zero.

The zero crossings may be a positive-going signal or a negative-going signal depending on whether the transition is from light to dark or from dark to light.

The basic system described in Ser. No. 939,061 develops an artificial black signal level and measures all detected white signals from that arbitrary black level. This prior art system is highly successful and for general applications has achieved commercial acceptance and is a leader in the state-of-the-art.

The output of the digital video processor is a pulse generated whenever the signal passes through zero. Unfortunately, as the light conditions deteriorate and the texture properties of the background material diffuse the light in combination with detecting narrow fingers or strips, the output signal from the video camera becomes very marginal and noise riding on the video signal has a tendency to cross the zero line which is detected by the video processor as zero crossings. The noise instituted zero crossings result in false alarm signals and degrade the performance of the overall system.

Figure 1:
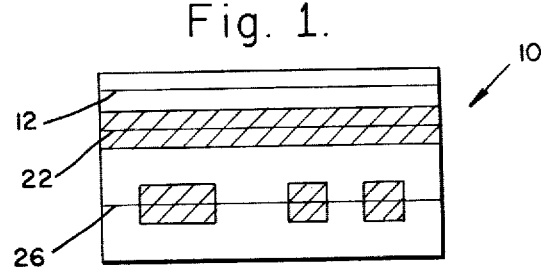
FIG. 1 illustrates a typical scene being viewed by the image processor camera.

Referring now to FIG. 1, there is shown a typical scene 10 that may be seen by the video camera as it scans left to right at the line scan rate of 15.75 kilohertz and from top to bottom at a 60 hertz rate.

Reference 12 illustrates a scan where the camera sees only a white background information. Since the scan 12 does not transverse any scene other than the background scene, the output signal as shown in FIG. 2a will be either curve 14, 16 or 18 depending upon the shade of the background material, the amount of light available, and the general quality of the video camera.

Figure 2:
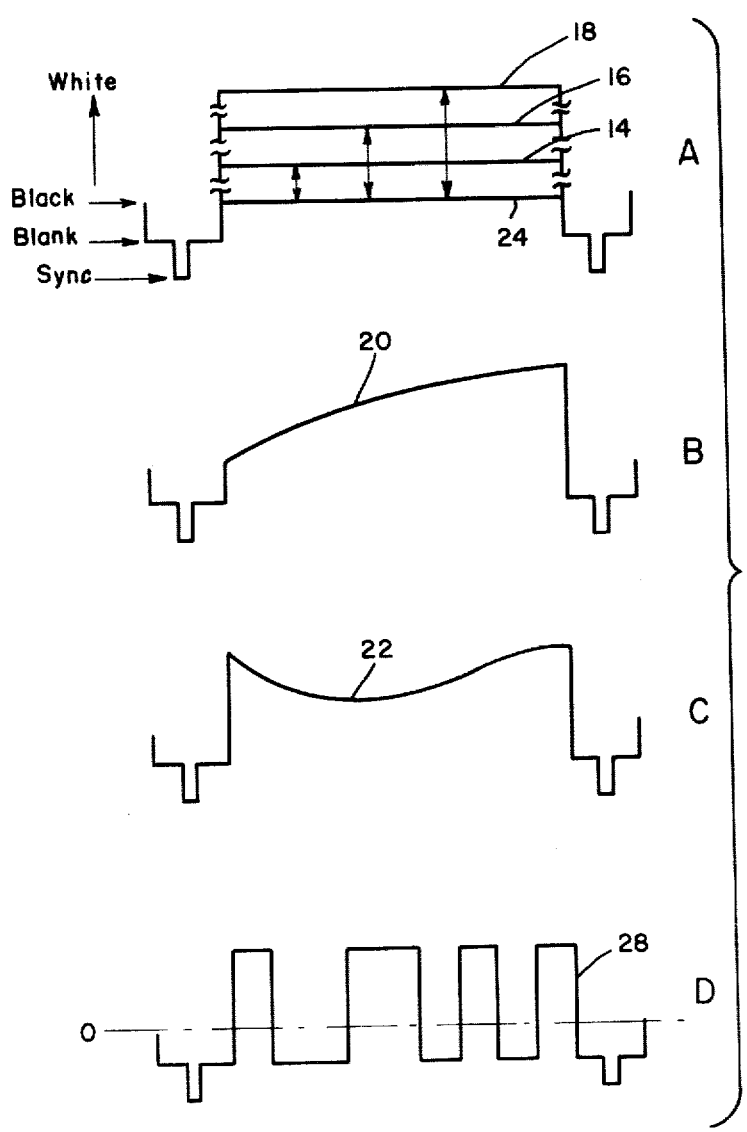
FIG. 2 is a series of diagrams illustrating the effect of shading in the vidicon camera.

In an idealized situation, the curves illustrated in FIG. 2a will be substantially rectangular as shown by curves 14, 16 and 18. Unfortunately vidicon cameras do not produce a uniform output signal across the faceplate due to various anomalies in the vidicon, and as a result the output of the vidicon when viewing a constant level signal produces a variable output containing shading as shown in FIG. 2b as curve 20 and in FIG. 2c as curve 22.

The shading illustrated in curve 20 and in curve 22 shows the effects of shading on the output signal which should be uniform as shown by curves 14, 16 or 18 in FIG. 2a.

The effect of shading causes a variation in the amplitude of the output signal and with noise usually riding on the signal and modulating the output signal it becomes very possible for noise spikes or noise anomalies riding on the envelope to cross the zero threshold and thereby generate false zero crossings in the presence of a constant background signal as viewed by scan 12. The background signal then becomes digitized and supplies false information to the pattern recognizer.

Referring again to FIG. 1, there is shown a video scan 22 passing through a constant dark background. Since the complete scan of 22 is constant the output should be constant and in a perfect system would be illustrated as curve 24 in FIG. 2a. Unfortunately the shading effect as illustrated in FIGS. 2b and 2c will prevent curve 24 from being constant and as a result noise anomalies modulating curve 24 will have the same effect of jumping above the line causing false zero crossings to be detected.

In other words, the scan of a constant background, whether it is scan 12 or scan 22, will produce the same possibility of false digitized information being generated by the output of the vidicon camera as a result of shading.

Referring again to FIG. 1, there is shown a scan 26 passing through alternate dark and light spots. In the absence of shading, the output of the vidicon for scan 26 is illustrated as curve 28 in FIG. 2d.

The digital processor detects each zero crossing. False zero crossings caused either by video shading or noise anomalies are equally objectionable. It will be appreciated, however, that the effect of video shading is less on scan 26 where the frequency rate of detecting zero crossings is greater than on scans 12 and 22 where each scan at the rate of 15.75 kilohertz produces only a single zero crossing for the scan.

Figure 3:
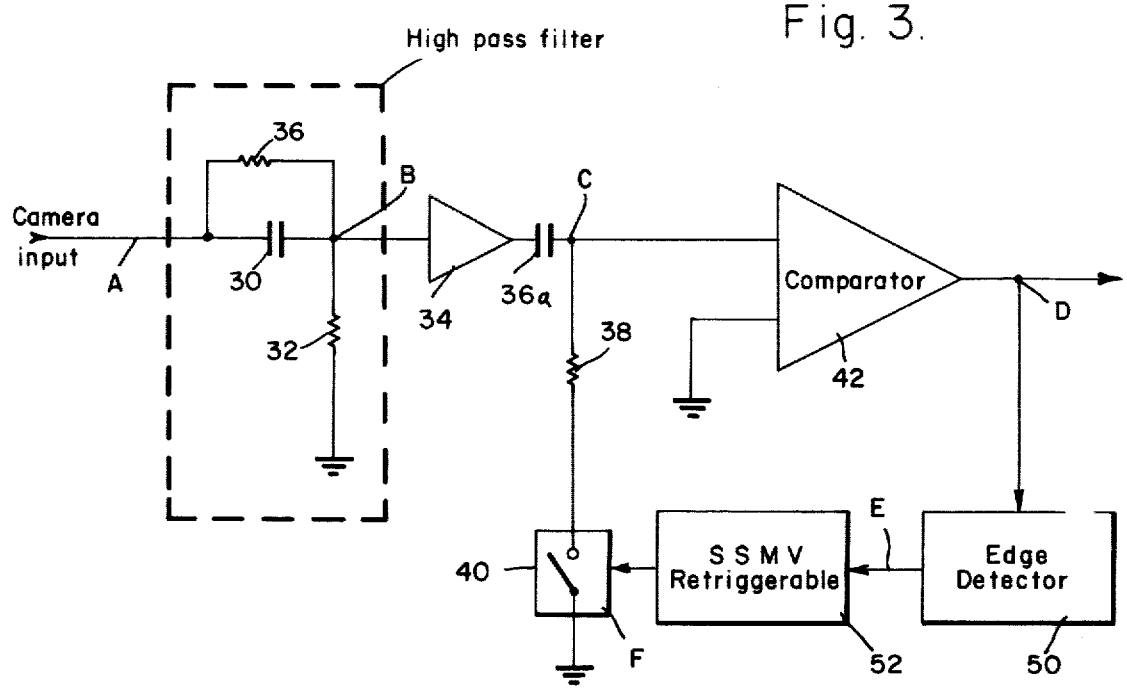
FIG. 3 is a schematic diagram for causing the white going signals and the dark going signals to vary around ground.
Figure 4:
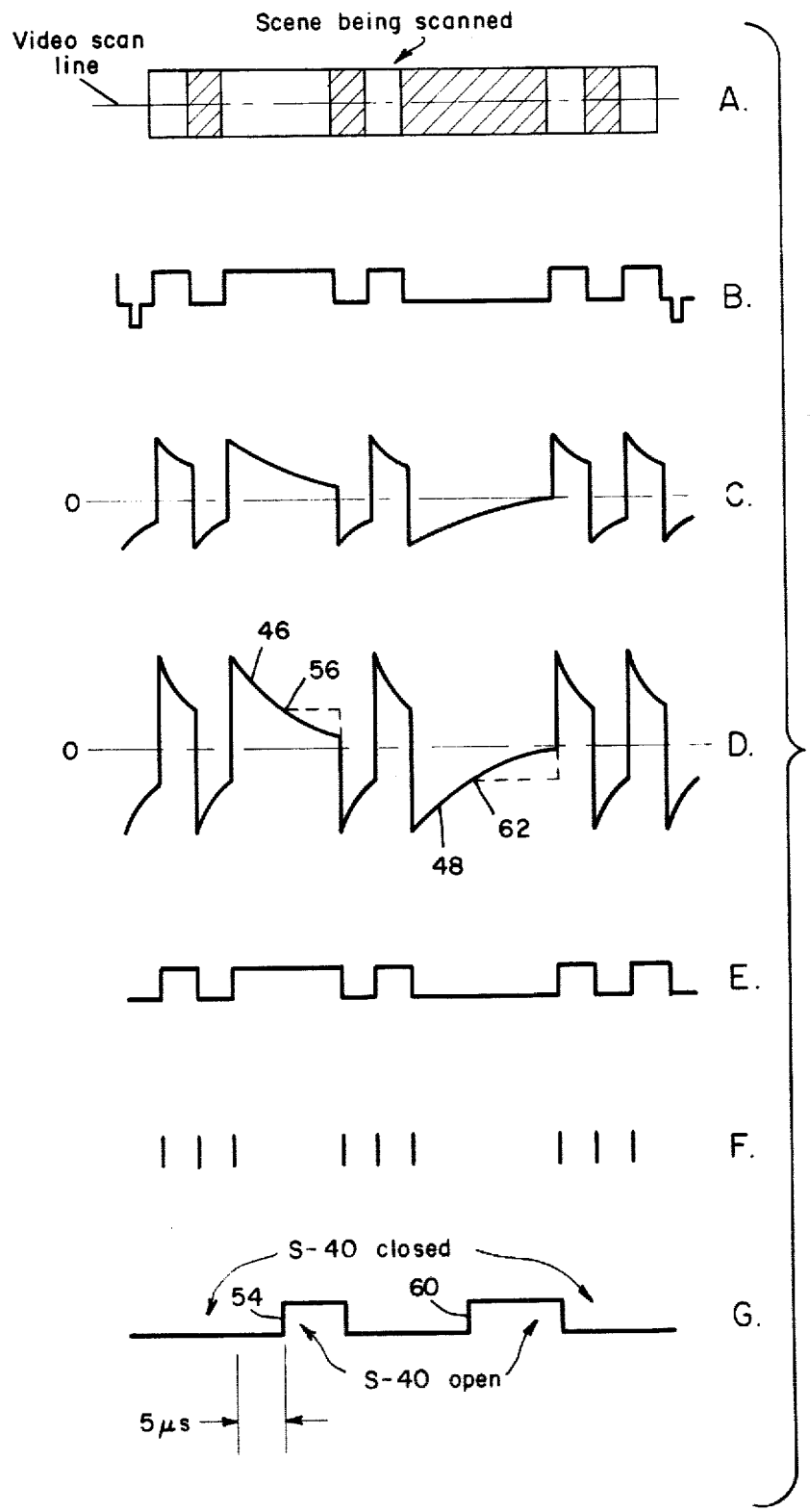
FIG. 4 is a series of wave forms at selected points on the schematic diagram of FIG. 3.

Referring now to FIGS. 3 and 4, there is shown a schematic diagram and wave forms illustrating the basic principals of the present invention.

A video camera is directed to the scene being scanned such as that illustrated as Curve A in FIG. 4. The output from the video camera in FIG. 3 is fed to a high pass filter comprising a capacitor 30 and resistor 32 to ground. The output of the high pass filter is fed to an isolation amplifier 34 having a high input impedance so as to minimize the loading effect of the high pass filter. The RC time constant of capacitor 30 and resistor 32 is relatively short and a portion of the undifferentiated signal is fed forward to the input of 34 through resistor 36. The effect is to retain some of the low frequency components of the video signal which is effectively differentiated by the high pass filter.

Curve b in FIG. 4 illustrates the substantially square wave input from the camera input feeding the high pass filter as at point A in FIG. 3. The action of the high pass filter comprising capacitor 30, resistor 36 and resistor 32 to ground differentiates the video signal as shown in curve C of FIG. 4 and represents the waveform at point B in FIG. 3.

In the preferred embodiment resistor 36 feeds a portion of the input signal forward into the input of 34. Low frequencies are attenuated about 12 db.

The shading effect of the vidicon camera is basically a low frequency phenomena existing at the scan rate frequencies of 15.75 kilohertz and at the vertical scan rate of 60 hertz. The shading is minimized by attenuating the low frequency components or in boosting the high frequency components which produces the same relative effect which is to produce a substantially flat frequency spectrum. The high pass filter comprising capacitor 30, resistor 36 and resistor 32 to ground produces a relative high frequency boost thereby tending to equalize the amplitude output across the face of the vidicon.

The output of the isolation amplifier 34 is fed to a coupling capacitor 36 which feeds one terminal of the comparator 42 and develops a voltage across resistor 38 connected through a controllable switch 40 to ground. The other terminal of comparator 42 is connected to ground thereby generating an output signal whenever the input signal from capacitor 36a passes through ground either in a positive direction or in a negative direction.

The wave form at C is illustrated in FIG. 4 as curve D and it will be apparent that the combination of capacitor 36 and resistor 38 will have an additional effect of differentiating the signal even more so creating higher peaks than is shown in curve C of FIG. 4. This effect is minimized by the fact that the time constant of capacitor 36 and resistor 38 is relatively long compared to the time constant of capacitor 30 and resistor 32.

In the normal operation capacitor 36 (as a result of the input video signal from isolation amplifier 34) will be continuously charged and discharged through resistor 38. With the other end of comparator 42 connected to ground, the comparator 42 will generate an output signal whenever the waveform from capacitor 36a passes through zero and hence an output will appear at the output of the comparator 42. Point D is illustrated as curve E in FIG. 4. Curve E illustrates the fact that every time the detected signal goes through zero an output pulse is generated which in effect is the digital video output signal which is fed to the digitizer for processing by the video processor.

The use of coupling capacitor 36a and resistor 38 connected to ground decouples the DC components from the signal and allows the positive-going signal representing a bright background to vary above ground and in the same fashion allows the negative-going signal representative of a dark element to vary below ground as determined by the comparator 42 which measures all zero crossings relative to ground. In other words, the unobvious advantage results in that a signal has been generated in which changing the light level allows the black part of the signal to go as proportionately negative as the white part of the signal goes positive. This of course should be compared to prior art systems where light going signals are always measured relative to black as a reference. It will be appreciated therefore that the threshold value is always at zero.

A review of curve D in FIG. 4 will show that where the frequency of signals is relatively high, the differentiated signal invariably approaches a change before the signal has decayed to any appreciable amount.

Unfortunately in those areas of the scene where there are few or no transitions from light to dark or vice versa, such as at point 46 on curve D, the decaying curve 46 comes perilously close to the zero crossing line. Noise signals which are always present may or may not cross over the zero crossing lines and thereby generate false zero crossings leading to the degradation of performance.

The same problem is observable as a point 48 on curve D of FIG. 4 which results when a dark portion of background is detected and curve 48 decays again from the negative portion perilously close to the zero crossing line. Again, noise riding on curve 48 may initially cross the zero crossing line which is detected by the comparator as a zero crossing and generates a false output signal.

In the embodiment illustrated in FIG. 3, resistor 38 performs the functions of charging and discharging capacitor 36a so that in curve D of FIG. 4 the discharge rate of curve 46 and curve 48 will be the same; however, curve 48 will get closer to the zero crossing line because the dark signal illustrated is longer than the light signal illustrated.

Switch 40 is made controllable in order to prevent the further charge or discharge of capacitor 36a as a result of the absence of transitions in curves 46 and 48. A review of FIG. 3 will show that once switch 40 is opened, capacitor 36a can neither charge or discharge. Then for all intents and purposes the time constant becomes infinite and the circuit shows a d.c. response. Since the time constant is a product of capacitor 36a and resistor 38, opening the switch 40 effectively makes the resistance infinite resulting in an infinite time constant meaning the frequency response goes down to zero.

The effect of opening switch 40, therefore, maintains the charge on capacitor 36a and thereby prevents either curve 46 or curve 48 from decaying to the zero crossing point.

The control of switch 40 is achieved by feeding the output from the comparator to an edge detector 50 which generates a spike pulse whenever the output of the comparator 42 indicates a zero crossing. The output of the edge detector 50 is illustrated as curve F in FIG. 4 and represents a series of spikes as indicated by curve E of FIG. 4. In the embodiment illustrated, the output of the comparator 42 will generate a zero crossing regardless of whether the detected zero crossing is going from a positive to a negative direction or from a negative to a positive direction. The output of the edge detector illustrated as curve E will always be a positive pulse in the presence of a zero crossing.

A single shot retriggerable multi vibrator 52 having a given pulse width that is arbitrarily selected at approximately 5 microseconds is turned on by the spike pulse F generated by the edge detector 50. A pulse width of 5 microseconds is selected to be slightly longer than the shortest element being detected. In other words, every time a zero crossing is detected, an output of the edge detector impulses the single shot retriggerable multi vibrator which generates a 5 microsecond pulse which closes switch 40 for that length of time.

Curve G of FIG. 4 illustrates the operation of switch 40. Since zero crossings are detected at a rate that is greater than one every 5 microseconds, switch 40 is maintained closed until more than 5 microseconds passes and no zero crossings are detected. This is indicated in curve F as point 54 at which time more than 5 microseconds has passed since the last zero crossings, thereby allowing switch 40 to open and maintain the charge on capacitor 36a at a value determined by point 56 on curve 46. This value will be maintained on the capacitor 36a and will allow the signal to move positively or negatively with respect to ground until the input signal passes through zero at which point the comparator 42 will detect a zero crossing and the output of the edge detector 50 will impulse the single shot multi vibrator 52 to again close the switch 40 and allow capacitor 36 to charge and discharge through resistor 38.

The same effect takes place on the charging of capacitor 36a as shown at curve 48 when at point 60 on curve G of FIG. 4 more than 5 microseconds has passed since the last zero crossing which allows switch 40 to open and maintain the charge on capacitor 36 as at point 62. The value on capacitor 36a follows the input signal until the input signal passes through zero at which point the comparator 42 detects the output change as a zero crossing and the edge detector 50 again impulses the single shot multi vibrator 52 so as to close switch 40 and allow capacitor 36 to charge and discharge through resistor 38.

A review of circuit illustrated on FIG. 3 will show that whenever transitions or zero crossings are closer together than 5 microseconds or any other arbitrary time, the comparator 42 is AC coupled to the output of the isolation amplifier 34 but whenever the transitions are further apart than an arbitrary amount such as 5 microseconds, the output of isolation amplifier 34 is effectively DC coupled to the comparator 42.

The line scan frequency of the conventional video camera is at the frequency of 15.75 kilohertz which is a period of approximately 63.5 microseconds. The time for the blanking pulse by convention is approximately 10 microseconds, leaving approximately 53.5 microseconds for active scanning. Experimentation has indicated that a ten percent interval or approximately 5 microseconds is a compromise time during which the zero crossing should be achieved.

In the preferred embodiment the blanking pulses and the sync pulses may adversely affect the zero crossings and in order to prevent this the single shot multi vibrator 52 is inhibited by an output of the blanking pulse thereby preventing switch 40 from closing during the blanking time.

In order to prevent latchup problems where the camera sees no zero crossings for a complete scan, a second multi vibrator is impulsed by the edge detector 50 which has the effect of closing switch 40 once for each scan line of the video camera. These techniques are within the state of the art and do not represent part of the present invention and, hence, the logic circuit for controlling switch 40 is not illustrated.

There are applications in pattern recognition systems where it is desirable to displace the video signal with respect to the ground level threshold but at the same time maintain the proportionality of black to white when the illumination changes. For example, it is sometimes necessary to detect white lines on a black background, such as a silicone wafer, which is equivalent to looking at a TV presentation that has been described as looking at white lines on a football field. In such a case the noise in the background has a tendency to be digitized thereby creating false zero crossings.

The zero crossing level is capable of being changed relative to the signal by changing the charge and discharge rate of the coupling capacitor 36a illustrated in FIG. 3. In the circuit illustrated in FIG. 3 the charging rate of coupling capacitor 36a is the same as the discharging rate since both the discharging and the charging of the capacitor must take place through resistor 38.

The implementation of a signal dependent charge-discharge means may be achieved by simply utilizing a different resistor connected to ground through a controllable switch that is in turn controlled by a single shot multi vibrator which is actuated by an edge detector that detects positive-going zero crossings, and a second edge detector used to detect only negative-going zero crossings. In this way a different charging resistor and discharging resistor may be independently actuated to control the zero crossing points on the signal.

Figure 5:
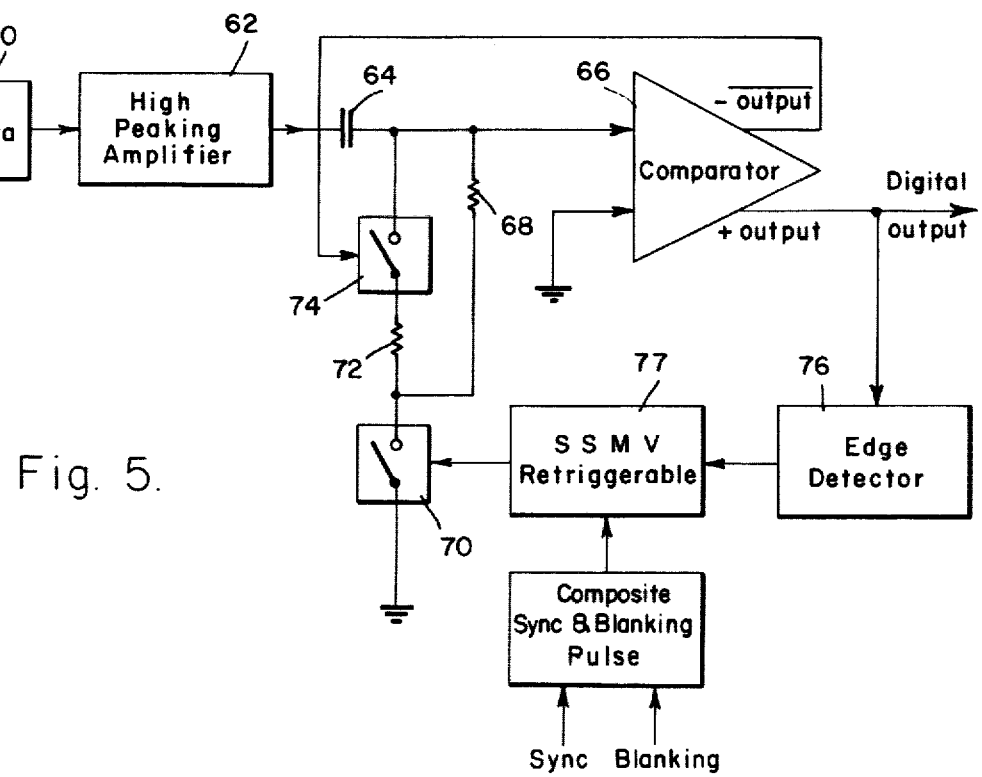
FIG. 5 is a schematic diagram illustrating how the charging and discharging rate of a coupling capacitor may be varied in response to the output signal detected.

A simpler means for providing separate charging and discharging rates is illustrated in FIG. 5.

Referring now to FIG. 5, there is shown a video camera 60 feeding a high peaking amplifier 62 for boosting the high frequency components of the detected video signal. The output of the high peaking amplifier is set to a coupling capacitor 64 which is connected to a comparator 66, the other side of which is connected to ground for generating a first output when measuring positive-going signals passing through zero and a second output when measuring negative-going signals passing through zero.

A resistor 68 is connected at one end to the junction of capacitor 64 and comparator 66 and at the other end to ground through a controllable switch 70. A resistor 72 is connected to the junction of resistor 68 and switch 70 at one end and at the other end to a controllable switch 74 connected to the output of capacitor 64 and comparator 66. The output of comparator 66 generates a signal in the presence of a zero crossing which is used to impulse edge detector 76 to control the single shot multi vibrator 77 and eventually to close switch 70 as previously described. The second output of comparator 66 generates an output signal in the presence only of a negative-going zero crossing, which signal is used to close switch 74.

A review of FIG. 5 will show a marked similarity to that shown in connection with FIG. 3 with the exception of resistor 72 and switch 74.

The operation of the circuit illustrated in FIG. 5 is the same as that described and illustrated in connection with FIG. 3 in that in the absence of a zero crossing within a 5 microsecond time period, the single shot multi vibrator 77 relaxes and switch 70 is allowed to open thereby maintaining the charge on capacitor 64 at the last value.

A review of curve D of FIG. 4 will show this happening at point 56 on curve 46 and at point 62 on discharge curve 48.

The discharge rate of the capacitor may be changed, however, since the second output of the comparator 66 which generates a signal in the presence of a negative-going zero crossing, has the effect of closing switch 74 thereby placing resistor 72 in parallel with resistor 68 and thereby effectively changing the discharging total resistance affecting capacitor 64 to ground and in this way will change the slope of curve 46 illustrated as curve D in FIG. 4.

In all other respects the operation of FIG. 4 is the same as that described in FIG. 3 in that in the absence of a zero crossing, switch 70 will open and the output voltage from the high peaking amplifier 62 will in effect be DC coupled to the comparator 66.

By way of review, it can be appreciated, therefore, that the circuit of FIG. 5 will have the effect of causing the charge rate of 64 to have a different value from the discharge rate of 64 and thereby compensate and improve the false alarm rate associated with certain scenes being viewed by the video camera 60.

In other words, it is now possible to adjust the amount of signal above the zero threshold and below the zero threshold depending only on a given environment situation that is being observed by the camera and still maintain proportionality and therefore the independence of zero crossings with respect to light level induced video signal amplitude changes is preserved.

I claim:

1. An adaptive video processor for use with a pattern recognition system comprising:
    video camera means for generating a video signal representative of an area being scanned,
    circuit means connected to the output of said video camera for generating a substantially constant amplitude output signal,
    comparing means for generating an output signal whenever said video signal changes positively or negatively with respect to ground,
    capacitor means interconnecting said circuit means with said comparing means, and
    capacitor charging and discharging means selectively controlled by the output of said comparing means for controlling the charging and discharging of said capacitor means to ground as a function of the output signals received from said comparing means.

2. An adaptive video processor for use with a pattern recognition system according to claim 1 in which said video camera means incorporates a horizontal scan frequency of 15.75 kilohertz and a vertical scan frequency of 60 hertz.

3. An adaptive video processor for use with a pattern recognition system according to claim 2 in which the output of said camera means at the substantially low horizontal and vertical scan frequencies generates a spurious output signal that varies in amplitude with frequency.

4. An adaptive video processor for use with a pattern recognition system according to claim 1 in which said circuit means includes a high pass filter for differentiating the video signal to provide a boost to the high frequency components of the video signal that compensates the video signal for loss of resolution in the camera at the higher frequencies.

5. An adaptive video processor for use with a pattern recognition system according to claim 4 which includes means for combining a portion of the input video signal with the differentiated video signal for adding a portion of the low frequency component of the video signal to the differentiated video signal for preventing false crossings.

6. An adaptive video processor for use with a pattern recognition system according to claim 1 which includes an isolation amplifier of high impedance between the circuit means and the capacitor means to prevent the charging and discharging of said capacitor means from loading down the output of said circuit means.

7. An adaptive video processor for use with a pattern recognition system according to claim 1 in which said capacitor charging and discharging means comprises resistor means and switch means for charging and discharging said capacitor at selected rates in response to output signals from said comparing means.

8. An adaptive video processor for use with a pattern recognition system according to claim 7 in which said resistor means is a single resistor and said switch means is a single switch whereby said charging rate and said discharging rate of said capacitor means is the same.

9. An adaptive video processor for use with a pattern recognition system according to claim 1 which includes a first resistor for controlling the charging of said capacitor and a second resistor for controlling the discharging of said capacitor.

10. An adaptive video processor for use with a pattern recognition system according to claim 9 in which said first resistor is connected to ground through a first switch and said second resistor is connected to ground through a second switch and in which said first switch is controlled by an output of said comparator that is positive-going and said second switch is controlled by an output of said comparator that is negative-going.

11. An adaptive video processor for use with a pattern recognition system according to claim 1 in which a blanking or sync pulse prevents said capacitor means from being charged or discharged.

12. A circuit for adaptively changing an AC coupled circuit to an effectively DC coupled circuit comprising:
    means for generating an input signal,
    means for feeding said input signal through a coupling capacitor to a comparator reference to ground,
    means for charging and discharging said capacitor to ground through a controllable switch whereby said input signal is AC coupled to said comparator with the switch closed, and
    means responsive to the output of said comparator for opening said switch whereby said input signal is effectively DC coupled to said comparator.

13. A circuit according to claim 12 in which said charging and discharging means are the same.

14. A circuit according to claim 12 in which said charging and discharging means are different.

* * * * *